United States Patent [19]

Sheppard et al.

[11] 3,979,500

[45] Sept. 7, 1976

[54] PREPARATION OF FINELY-DIVIDED REFRACTORY POWDERS OF GROUPS III-V METAL BORIDES, CARBIDES, NITRIDES, SILICIDES AND SULFIDES

[75] Inventors: Robert S. Sheppard, Doylestown; Franklin E. Groening, Akron, both of Ohio

[73] Assignee: PPG Industries, Inc., Pittsburgh, Pa.

[22] Filed: May 12, 1975

[21] Appl. No.: 576,835

Related U.S. Application Data

[63] Continuation of Ser. No. 356,544, May 2, 1973, abandoned.

[52] U.S. Cl. ............................... 423/289; 423/250; 423/251; 423/252; 423/254; 423/256; 423/290; 423/291; 423/297; 423/344; 423/345; 423/346; 423/406; 423/409; 423/411; 423/412; 423/439; 423/440; 423/561
[51] Int. Cl.² ............... C01B 35/04; C01B 21/06; C01B 31/30; C01B 33/06
[58] Field of Search ........... 423/289, 290, 291, 297, 423/344, 345, 346, 406, 409, 411, 412, 439, 440, 561, 249, 250, 251, 252, 254, 256

[56] References Cited

UNITED STATES PATENTS

| | | | |
|---|---|---|---|
| 3,218,205 | 11/1965 | Ruehrwein | 148/175 |
| 3,253,886 | 5/1966 | Lamprey et al. | 423/289 |
| 3,399,980 | 9/1968 | Bourdeau | 423/440 |
| 3,485,586 | 12/1969 | Swaney | 423/440 |
| 3,755,541 | 8/1973 | Strepkoff | 423/346 |
| 3,761,576 | 9/1973 | Groening | 423/440 |
| 3,848,062 | 11/1974 | Steiger et al. | 423/440 |

*Primary Examiner*—Herbert T. Carter
*Assistant Examiner*—Brian E. Hearn
*Attorney, Agent, or Firm*—Irwin M. Stein

[57] ABSTRACT

The preparation of metal and metalloid carbides, borides, nitrides silicides and sulfides by reaction in the vapor phase of the corresponding vaporous metal halide, e.g., metal chloride, with a source of carbon, boron, nitrogen, silicon or sulfur respectively in a reactor is described. Reactants can be introduced into the reactor through a reactant inlet nozzle assembly. Inhibition and often substantial elimination of product growth on exposed surfaces of such assembly is accomplished by introducing the corresponding substantially anhydrous hydrogen halide, e.g., hydrogen chloride, into the principal reactant mixing zone.

16 Claims, No Drawings

PREPARATION OF FINELY-DIVIDED REFRACTORY POWDERS OF GROUPS III-V METAL BORIDES, CARBIDES, NITRIDES, SILICIDES AND SULFIDES

This is a continuation of application Ser. No. 356,544, filed May 2, 1973, now abandoned.

DESCRIPTION OF THE INVENTION

The preparation of finely-divided borides, carbides, silicides, nitrides and sulfides of the metals and metalloids of Groups III to VI and the ferro group metals of Group VIII of the Periodic Table by reaction in the vapor phase of a vaporous halide of the metal or metalloid and a reactant gas containing a source of the non-metallic element with which the selected metal or metalloid is to be combined has been described. See, for example, U.S. Pat. Nos. 3,253,886, 3,340,020 and 3,485,586. See, also, the reference text, *Refractory Hard Metals*, by Schwarzkopf and Kieffer, The MacMillan Company, New York, N.Y. (1953). In the production of the aforementioned finely-divided compounds, the metal halide and reactant gas containing the source of boron, carbon, silicon, nitrogen or sulfur are brought together within a reactor at reaction temperatures. The solid products formed are removed from the reaction zone within the reactor, cooled or quenched as the case may be, and recovered by conventional fine particle collection techniques, e.g., cyclone, electrostatic precipitators, dust collectors, etc.

In order to produce finely-divided particles of the aforesaid compounds having relatively narrow particle size distributions, it is necessary to bring the reactants together quickly within the reactor at reaction temperatures most conducive for the formation of the desired compound. This procedure permits a goodly portion of the reaction to occur at substantially uniform conditions. Customarily, the reactants are introduced into the reactor through reactant inlet assembly means which, because of the nature of the process, is typically nearly adjacent to the reaction zone. There is a strong tendency for the solid products produced by the aforementioned vapor phase process to deposit upon the exposed surfaces of the aforesaid assembly. These deposits grow in size and can eventually partially or even completely block the inlet ports in the assembly through which the reactants flow into the reactor. Partial blockage of the inlet ports causes a deviation from the programmed reactant stream flow with the consequent upset in the ensuing reaction conditions, thereby causing additional product growth. When the reactants are introduced separately into the reactor, partial blockage of the reactant inlet ports also upsets reactant mixing efficiency, thereby increasing the tendency to form product growth on the inlet ports. Attempts at shrouding reactant inlet ports with inert gases, such as hydrogen or argon, have not proven entirely successful.

It has now been discovered that if hydrogen halide, the halide portion of which preferably corresponds to that of the metal or metalloid halide reactant, is introduced into the principal reactant mixing zone, i.e., the zone in the reactor wherein the reactants are mixed (if separately introduced), and/or first exposed to reaction temperatures, product deposits on the inlet nozzle assembly can be significantly reduced and, in some cases, entirely eliminated.

DETAILED DESCRIPTION

For many applications, the borides, carbides, silicides, nitrides and sulfides of the metals and metalloids described herein should have a relatively narrow particle size distribution. In order to achieve such a distribution, the metal halide and reactant gas are brought to and reacted at the selected reaction temperature(s) in a very short time interval. Preferably, the reaction is conducted out of contact with the exposed surfaces of the reactant inlet assembly and the reactor. Residence times in the reaction zone at reaction temperature are typically in the range of milliseconds as distinguished from seconds or minutes.

One method for conducting the above-described reaction is to heat both reactants to reaction temperature before mixing the reactants in the reactor. One difficulty with this method is that if precautions are not taken, the reactants react immediately upon contact with each other near the reactant inlet ports within the reactor. This method also establishes the principal reaction zone, i.e., the zone wherein most of the reaction, usually greater than 80%, occurs, within close proximity to the reactant inlet ports and often results in product growth on the exposed surfaces of such inlet ports. The use of a shrouding gas adjacent to the exposed portions of the inlet ports is partially effective; but, it is not entirely successful.

In a further method, both reactants are introduced (separately or premixed) at below reaction temperature into a high temperature reaction zone. However, unless the reactants are brought instantaneously to reaction temperatures, reaction occurs over a fairly broad reaction temperature range and produces a product of fairly wide particle size distribution. Another method that can be used involves heating one of the reactants to above reaction temperature while the other reactant remains at below reaction temperature. Thereafter, the reactants are mixed in the reaction zone. Here again, the mixing must be accomplished over a relatively short time interval to obtain a fairly narrow product size distribution.

It has now been discovered that if hydrogen halide is introduced into the principal reactant mixing zone, i.e., the zone wherein the reactants are mixed and/or first exposed to reaction temperatures, product growth on the exposed surfaces of the reactant inlet ports is significantly decreased and, in some cases, substantially entirely eliminated. The retarding or elimination of product growth on the exposed surfaces of the reactant inlet ports is extremely important for commercial processes where the reaction must be conducted continuously for extended periods. While not intending to be limited by any particular theory, it is believed from the evidence at hand that the presence of hydrogen halide in the principal reaction zone retards reactions from occurring until the reactants have had a chance to move more into the interior of the reactor and away from the exposed surfaces of the reactant inlet ports. Thus, the reaction is conducted within the reactor and spaced from the reactant inlet ports and the exposed interior surfaces of the reactor.

As earlier indicated, hydrogen halide is introduced into the principal reactant mixing zone to retard or prevent deposits of product and the growth of such deposits on exposed reactor surfaces adjacent the zone of reactant introduction. In most reactors, and especially in recirculating reactors as distingishied from plug flow type reactors, mixing of reactants occurs to some extent throughout the reactor because of the use of an excess of one reactant (normally the less expensive reactant) and the presence of unreacted reactants in the product effluent. There is, however, a zone wherein the reactants are exposed jointly to reaction temperatures. This can be accomplished by premixing the reactants at a temperature at which they do not react and mixing them with a heat source, e.g., a hot hydrogen plasma, to bring immediately the reactants to reaction temperature. The heat source, can of course, be derived from any source, e.g., a further chemical reaction, the heat of reaction from an initial reaction or an external heat source. Alternatively, the reactants can be introduced separately into the reactor, mixed and exposed there together to reaction temperatures. Any of the methods previously discussed can be used. Regardless of the particular method used, a zone in the reactor is established wherein the reactants, usually substantially all of the reactants, are exposed jointly to reaction temperatures. This zone is the principal reactant mixing zone and usually just precedes the beginning of the reaction zone. If, the reactants are introduced into the reactor and mixed at more than one location, e.g., serially, at reaction temperatures then a series of principal mixing zones would exist and the method described herein can be practiced at each of such mixing zones.

The hydrogen halide introduced into the principal reactant mixing zone is substantially anhydrous since the presence of water in the reactor would cause corrosion problems within the reactor and downstream equipment. The hydrogen halide is preferably in the gaseous state; however, liquid hydrogen halide could be used since the heat of the reaction would vaporize the hydrogen halide easily. The hydrogen halide used can be selected from the group consisting of hydrogen chloride, hydrogen bromide, hydrogen fluoride and hydrogen iodide. Hydrogen chloride is economically preferred. The halide portion of the hydrogen halide is generally the same as the halide portion of the gaseous metal or metalloid halide reactant in order to avoid the introduction into the system of different halogen gaseous species which would require complex and expensive recovery and separation equipment for the separation and recovery of the various components of the reactor effluent product stream.

The amount of hydrogen halide introduced into the mixing zone is that amount which is sufficient to retard the growth of product on the exposed surfaces of the reactor and/or the reactant inlet nozzle assembly, i.e., a retarding or inhibiting amount. For purposes of this description the term "exposed surfaces of the reactor" is intended to mean and include the internal surfaces of the reactor and the reactant inlet nozzle assembly and any other surfaces adjacent the zone of reactant introduction, i.e., the zone wherein reactant(s) are introduced into the reactor, subject to deposits of product occurring thereupon. Typically, from about 1 to about 100 weight percent of hydrogen halide, based on the amount of metal halide reactant, is introduced into the principal reactant mixing zone. Preferably, from 2 to 80, more preferably from 5 to 50, weight percent of hydrogen halide is used. This amount of hydrogen halide is added to the reactor and is to be distinguished from hydrogen halide formed in the reactor as a result of the reaction, i.e., that formed by the combination of hydrogen and halogen within the reactor.

The manner in which hydrogen halide is introduced into the principal reactant mixing zone is not critical to the present invention. Thus, the hydrogen halide can be introduced with one or more of the reactant gases, i.e., the hydrogen halide can be used in part or in whole as the carrier gas for the reactants, or the hydrogen halide can be introduced as a shroud gas between the reactants. Preferably, the hydrogen halide is introduced with at least one of the reactants, e.g., the metal halide reactant. In the case where the reactants are introduced into a hot gaseous stream, i.e., a plasma, hydrogen halide can be introduced into the plasma stream prior to the introduction of the reactants therein. Additionally, the hydrogen halide can simply be introduced as a separate stream directly into the principal mixing zone.

An important feature of the present invention is the placement of a sufficient amount of hydrogen halide to retard product growth on the reactant inlet ports into the mixing zone, i.e., the zone where the reactants furst experience jointly temperatures at which a reaction between the reactants can occur. Thus, if the hydrogen halide is introduced indiscriminately into the reactor, the desired effect (avoidance of product growth) may not be accomplished. Since the mixing and reaction zones are substantially indiscernible to the human eye in certain methods of reactant introduction because of the short residence times involved, it is important to use a method for introducing hydrogen halide which insures its presence in the principal reactant mixing zone. This can be accomplished, as indicated above, by introducing the hydrogen halide with the reactants, e.g., as a carrier gas, or by establishing a stream of hydrogen halide in the mixing zone prior to commencement of the introduction of the reactants, or any other equivalent method.

The present invention is applicable to the vapor phase production of borides, carbides, silicides, nitrides and sulfides of the metals and metalloids of Groups III, IV, V, and VI and the ferro metals of Group VIII of the Periodic Chart of the Elements, such as that found on the back cover of the aforementioned text, *Refractory Hard Metals*. Included in Group III of the Periodic Chart of the Elements are the metals of the actinide series, e.g., thorium, uranium, neptunium, and plutonium. The present invention is particularly applicable to the preparation of the borides, carbides and nitrides of the metals and metalloids, especially the transition metals of Group IV – VI of the aforementioned Periodic Chart of the Elements. More particularly, the present invention is applicable to the preparation of the borides, carbides and nitrides of the metals, preferably the transition metals of Groups IV and V of such Periodic Chart.

More specifically, the metals and metalloids within the aforementioned groups contemplated include: boron, aluminum, silicon, titanium, zirconium, hafnium, tantalum, vanadium, niobium, chromium, molybdenum, tungsten, iron, cobalt, nickel, thorium, uranium, neptanium and plutonium. As used hereinafter in the specification and claims, the term "metal(s)" is intended to mean and include both the metals and metalloids referred to above. Of particular interest are the metals silicon, titanium, zirconium, hafnium, tantalum, vanadium, niobium and tungsten.

In accordance with the present invention, halides of the aforementioned metals that are volatile at the temperatures of the particular reaction performed are used in the present process. While the chlorides of the metals are preferred, the fluorides, bromides or iodides can also be used. In addition to the halides of the principal valence of the aforementioned metals, subhalides, e.g., subchlorides, can also be used. Further, mixtures of halides, such as chlorides and bromides, or of halides and subhalides can be employed.

Examples of such halides (as exemplified by the chlorides) include: boron trichloride, silicon tetrachloride, titanium tetrachloride, zirconium tetrachloride, hafnium tetrachloride, tantalum pentachloride, vanadium pentachloride, niobium pentachloride, chromium chloride, moylbdenum chloride, tungsten hexachloride, ferric chloride, cobaltic chloride, nickel chloride, uranium hexachloride and thorium tetrachloride.

For the non-metallic portion of the compositions contemplated herein, a source of boron, carbon, silicon, nitrogen or sulfur is introduced into the reaction zone. As a source of carbon, there can be mentioned hydrocarbons and halogenated hydrocarbons or mixtures of such compounds. As used herein, the term "halogenated hydrocarbon", e.g., "chlorinated hydrocarbon", is intended to mean and include both compounds of carbon, halogen and hydrogen, and compounds of carbon and halogen, e.g. carbon tetrachloride.

Typical of the hydrocarbons that can be used as the carbon source include the normally gaseous or liquid but relatively volatile hydrocarbons including saturated and unsaturated $C_1 - C_{12}$ hydrocarbons, such a methane, ethane, propane, the butanes, the pentanes, decanes, dodecanes, ethylene, propylene, the butylenes and amylenes, symmetrical dimethylethylene and like alkenes; cycloaliphatic and aromatic hydrocarbons, such as cyclopentane, cyclohexene, cyclohexane, toluene, benzene, etc.; and acetylenic compounds, of which may be noted acetylene, ethyl acetylene and dimethyl acetylene. Methane or propane are economically preferred. Rarely are hydrocarbons of more than twelve carbons used.

Examples of halohydrocarbons and halocarbons that can be used as the source of carbon in the process described herein include saturated and unsaturated compounds containing halogen(s) and from one to twelve, more usually one to eight, carbon atoms, such as methyl chloride, chloroform, ethyl chloride, carbon tetrachloride, dichlorodifluoromethane, n-propyl chloride, amyl chloride, vinyl chloride, 1,1-dichloroethylene, 1,2-dichloroethylene, 1,1-dichloroethane, 1,2-dichloroethane, ethylene dibromide, trichloroethylene, perchloroethylene, propylene dichloride, 1,1,2-trichloroethane, 1,1,1-trichloroethane, 1,1,1,2- and 1,1,2,2,-tetrachloroethane, hexachloroethane and like aliphatic chlorides, fluorides, bromides or iodides containing up to about twelve carbon atoms, most preferably up to about six carbon atoms. Aromatic halocarbon compounds, e.g., chlorocarbon compounds, also can be used. Such compounds include $C_6 - C_9$ halogenated aromatic compounds, such as monochlorobenzene, orthodichlorobenzene, paradichlorobenzene and the like. Cycloaliphatic halides, such as the $C_5 - C_6$ aliphatic halides, e.g., chlorinated cyclopentadiene, cyclohexylchloride, etc., can also be used. Preferably, the halogen of the halogenated hydrocarbon corresponds to the halide of the metal halide reactant and hydrogen halide introduced into the mixing zone.

Typically, the above-described hydrocarbons and halogenated hydrocarbons should be readily vaporizable (volatile) without tar formation since otherwise unnecessary difficulties which are unrelated to the process itself can arise, such as plugging of lines by decomposition and/or polymerization products produced in the course of vaporizing these reactant materials.

As a source of nitrogen, there can be used nitrogen, ammonia, and hydronitrides, e.g., $N_2H_4$ and $N_2H_4 \cdot NH_3$. Nitrogen and ammonia or mixtures are preferred.

As a source of boron, there can be mentioned boron tribromide, boron triiodide, boron trichloride, boron trifluoride, and hydroborides (boranes), e.g., $B_2H_6$, $B_5H_9$, $B_{10}H_{14}$, $B_6H_2$. Boron trichloride is preferred.

As a source of sulfur, there can be mentioned vaporous sulfur, hydrogen sulfide, sulfur halides, such as $S_2Cl_2$, $SCl_2$ and $S_2Br_2$. Hydrogen sulfide is preferred.

As a source of silicon, there can be mentioned silicon tetrachloride, tetrabromide and tetraiodide, hydrosilicides (silanes), e.g., $SiH_4$, $Si_2H_6$, $Si_3H_8$ etc., and halogenated hydrosilicides, e.g. $SiH_3Cl$, $SiH_2Cl_2$, and $SiHCl_3$. Silicon tetrachloride is preferred.

The amount of the reactant source of silicon, carbon, nitrogen, boron or sulfur with which the metal halide reactant is reacted should be at least in stoichiometric quantities with the metal halide reactant to satisfy the theoretical demand of the particular reaction desired. However, less than a stoichiometric amount of the source of silicon, boron, nitrogen, carbon or sulfur can be used. Normally, an excess amount of the less expensive reactant is employed in order to react substantially completely the more expensive reactant. The relative amounts of the reactants used is not critical. The stoichiometric amount of reactants required can be readily calculated by one familiar with this art.

In addition to the metal halide and source of silicon, carbon, nitrogen, boron or sulfur, it is customary to use, in addition, a reducing agent, such as hydrogen, to assist in the reduction of the metal halide. The amount of reducing agent, e.g., hydrogen, utilized in the above-described process should be at least that amount which is required stoichiometrically to satisfy the theoretical demand of the particular reaction desired, i.e., the amount required to combine with the theoretical amount of halogen liberated during the reaction taking into account the amount of hydrogen available from other sources present in the reactor. Typically, the amount of hydrogen used is in excess of the theoretical amount. When, for example, titanium carbide is produced using titanium tetrachloride as the titanium halide and a chlorinated hydrocarbon as the source of carbon, the theoretical amount or demand of hydrogen required can be expressed by the equation,

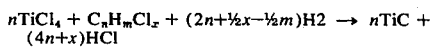

$$n\text{TiCl}_4 + C_nH_mCl_x + (2n+\tfrac{1}{2}x-\tfrac{1}{2}m)H_2 \rightarrow n\text{TiC} + (4n+x)\text{HCl}$$

wherein:

$n$ reflects the number of carbon atoms, $m$ reflects the number of hydrogen atoms, and $x$ reflects the number of chlorine atoms in the reactant compound of chlorine and carbon used. Similarly, when other titanium halides are used, the amount of elemental hydrogen used should be in excess of the chemical equivalent of the halogen of the titanium halide. Often, the amount of hydrogen utilized will be in excess of 10 times, and as high as 100 times, the amount of hydrogen shown to be required by the above equation or required to equal the chemical equivalence of halogen of the titanium halide.

As indicated above, any convenient method for bringing the reactants together at reaction temperatures can be used. Thus, for example, the reactants can be heated individually to or above reaction temperature and then admixed in a suitable reaction zone; further, one or more, but not all, of the reactants can be heated to temperatures in excess of reaction temperature and admixed in the reaction zone with the remaining reactant(s), which have been introduced into the reaction zone at temperatures below reaction temperature. The highly heated reactant(s) bring the remaining reactant(s) to reaction temperature quickly and cause formation of the composition desired. Further, the reactants can be introduced into the reactor at below reaction temperature and heated with a very hot heat source, e.g., an inert (argon) plasma.

Reaction temperatures for the processes described herein will, of course, vary with the reactants and the products being produced. Generally, such reaction temperatures will range from about 300° C. to about 3,000° C. Reaction temperatures for the production of various carbides, nitrides, borides and silicides from various reactants are well known and can be found on pages 61, 226, 275 and 322, respectively, of the reference text, *Refractory Hard Metals*, supra. That disclosure is incorporated herein by reference. Reaction temperatures for the preparation of metal sulfides also known. For example, titanium sulfide can be prepared in a hot tube by the reaction of titanium tetrachloride and hydrogen sulfide at about 600° C. Tungsten disulfide can be prepared by the reaction of tungsten hexachloride and hydrogen sulfide about 375°–550° C.

The products produced by the present vapor phase process are typically submicron in size and range from about 0.01 to about 1.0 micron.

Among the carbides that can be produced in accordance with the present process, there can be mentioned titanium carbide, zirconium carbide, hafnium carbide, vanadium carbide, niobium carbide, the tantalum carbides ($Ta_2C$, $TaC$), silicon carbide (alpha and beta), boron carbide ($B_4C$), chromium carbide, molybdenum carbide, the tungsten carbides ($W_2C$, $WC$), the thorium carbides ($ThC$, $ThC_2$), and the uranium carbides ($UC$, $U_2C_3$ and $UC_2$).

Among the nitrides that can be produced in accordance with the present process, there can be mentioned titanium nitride, silicon nitride, zirconium nitride, hafnium nitride, vanadium nitrides ($VN$, $V_3N$), niobium nitride, tantalum nitride, boron nitride, the chromium nitrides ($Cr_2N$, $CrN$), molybdenum nitride, tungsten nitride (beta, gamma and alpha), the molybdenum nitrides ($Mo_2N$, $MoN$), thorium nitride, the uranium nitrides ($U_2N_3$, $UN_2$), neptunium nitride and plutonium nitride.

Among the borides that can be produced in accordance with the present process, there can be mentioned the titanium borides ($TiB$, $TiB_2$), the silicon borides ($SiB_3$, $SiB_6$), the zirconium borides ($ZrB_2$, $ZrB_{12}$), hafnium boride, the vanadium borides ($VB$, $VB_2$), the niobium borides ($NbB$, $NbB_2$), the tantalum borides ($TaB$, $TaB_2$), the chromium borides ($CrB$, $CrB_2$), the molybdenum borides ($Mo_2B$, $MoB$) (alpha and beta) ($MoB_2$ and $Mo_2B_5$), tungsten boride, thorium boride and uranium boride.

Among the silicides that can be produced in accordance with the present invention, there can be mentioned titanium silicides, zirconium silicide, the vanadium silicides ($V_3Si$, $VSi_2$), niobium silicide, tantalum silicide, the chromium silicides ($Cr_3Si$, $CrSi$, $CrSi_2$), the molybdenum silicides ($Mo_3Si$, $MoSi_2$), tungsten silicide, thorium silicide, the uranium silicides ($USi$, alpha $USi_2$, beta $USi_2$), neptunium silicide and plutonium silicide.

Among the sulfides contemplated herein, there can be mentioned titanium disulfide, zirconium sulfide, tungsten disulfide, molybdenum sulfides, vanadium sulfides, thorium sulfide, tantalum sulfide, silicon sulfides, cobalt sulfides, etc.

Reference is made to the apparatus and reactant inlet assemblies described in FIGS. 1 and 2 of the U.S. Pat. No. 3,485,586, the sole Figures of U.S. Pat. Nos. 3,340,020 and 3,253,886, and the single Figure of U.S. Pat. No. 3,661,523 as examples of apparatus suitable for conducting the vapor phase reactions described herein. Such figures and the descriptions thereof in their respective patents are incorporated herein by reference. Briefly, such apparatus comprises a generally cylindrical reactor atop which is mounted axially a plasma generator. The plasma generator produces a hot gaseous plasma stream, e.g., a hydrogen plasma, which discharges into the center of the reactor. Interposed between the plasma generator and top of the reactor is an assembly having a central core through which the hot plasma stream passes. Inlets around the inside of the assembly and juxtaposed to the core allow the reactants and other gases to be introduced into the hot plasma. The inlets can be on the same horizontal level or displaced vertically. The inlets can be designed to discharge the reactants directly (along a single vector) into the plasma at any angle to the horizontal or to give the reactants circumferential direction, e.g., tangential to the plasma stream.

The present process is more particularly described in the following examples which are intended as illustrative only since numerous modifications and variations therein will be apparent to those skilled in the art.

In the following examples, volumes of gas are expressed in cubic feet per hour at standard conditions (14.7 pounds pressure and 70°F.), i.e., SCFH. The apparatus used in the following examples is similar to that described in U.S. Pat. No. 3,661,523 (referred to hereinabove), except that instead of an induction plasma heater, a direct current plasma arc heater was used. The arc heater is a medium voltage, medium amperage heater having a power input of 26 kilowatts. The heater operated with an efficiency of from about 53 to about 61 percent.

EXAMPLE I

Hydrogen at the rate of 300 standard cubic feet per hour (SCFH) was introduced into and heated by the medium voltage, medium amperage heater described above. The steam of hot hydrogen was projected through the center of a reactant inlet assembly (mixer) having two reactant annular inlet openings, one above the other. Each annular opening surrounded the path of the hot hydrogen stream. The metal halide and carbon source reactants were projected into the hot hydrogen stream from their respective inlet ports.

Titanium tetrachloride in an amount of 23.0 grams per minute, together with 10 SCFH hydrogen as a carrier gas, were introduced through the bottom slot of the mixer. 1,1,2-Trichloroethane in an amount equal to 15.5 grams per minute (92 percent excess based on the titanium tetrachloride), together with 45 SCFH hydrogen as a carrier gas, were introduced through the top slot of the mixer. The production of titanium carbide in this manner was conducted for 120 minutes. Thereafter, the reaction was terminated and the reactant inlet assembly examined. An examination of the assembly showed the existance of titanium carbide deposits attached to the plate of the mixer separating the two annular openings. The titanium carbide deposit found attached to the portion of the mixer separating the bottom and top slots was about ⅛ to ¼ inch thick and hung down from the mixer like a pendant. The titanium carbide product recovered was found to have a BET surface area of about 3.5 square meters per gram and a weight average particle size of about 0.36 micron(s).

EXAMPLE II

The procedure of Example I was repeated, except that the rate of titanium tetrachloride fed to the reactor was 23.4 grams per minute, the 1,1,2-trichloroethane feed rate was 17.3 grams per minute (110 percent excess), and 10 SCFH of argon was substituted for the hydrogen carrier gas introduced with the titanium tetrachloride. The process was continued for a period of 350 minutes, at which time the run was terminated and the reactant nozzle assembly inspected. Titanium carbide growth was found on the middle portion of the mixer in the same manner as described with respect to Example I. The titanium carbide product had a BET surface area of about 2.3 square meters per gram and a weight average particle size of about 0.54 microns.

Examples I and II show that product deposits occur on the reactant mixer assembly and that such deposits grow and accumulate. Such accumulations can extend 1 to 2 inches into the reactor. The growth is sometimes cylindrical in character and other times is conical. The conical shape of the growth is sometimes the shape of an inverted cone. Growth from the mixer plate separating the two reactant inlets causes significant deviation of the type of reactant mixing that occurs. At the beginning of the reaction, the titanium halide, e.g., titanium tetrachloride, and carbon source reactant, e.g., 1,1,2-trichloroethane, are charged directly into the hydrogen plasma wherein the reactants are mixed instantaneously. After product growth appears, the carbon source reactant (when the reactant sequence of Examples I and II are used) is discharged into the hydrogen plasma and is directed into the center of the reactor. The titanium halide, on the other hand, typically strikes the growth and is projected away from the plasma stream in a plane almost parallel to the face of the mixer. The reaction of the titanium halide reactant is thereby delayed and has the opportunity to react adjacent to and on reactor or mixer surfaces thereby aggravating the growth problem. Further, the amount of unreacted titanium halide reactant in the reactor effluent increases and the particle size distribution of the product changes from that obtained at the start of the reaction.

EXAMPLE III

The procedure of Example I was repeated, except that the rate of titanium tetrachloride was 23.1 grams per minute, the rate of 1,1,2-trichloroethane was 16.7 grams per minute (104.5 percent excess) and 11 SCFH of hydrogen chloride were substituted for the 10 SCFH of hydrogen introduced with the titanium tetrachloride. The process was operated for a period of 412 minutes, at which time the run was terminated and the reactant inlet mixer assembly inspected. No titanium carbide product growth of any significance was found on the reactant inlet assembly. The titanium carbide product recovered had a BET surface area of about 3.0 square meters/gram and a weight average particle size of about 0.41 microns.

EXAMPLE IV

The procedure of Example III was repeated, except that the titanium tetrachloride feed rate was 23.6 grams per minute and the 1,1,2-trichloroethane rate was 17.5 grams per minute. The process was operated for a period of 805 minutes before it was terminated for inspection of the mixer assembly. A very small and insignificant amount of titanium carbide growth was found hanging from the middle plate of the mixer.

EXAMPLE V

The procedure of Example I was repeated, except that the titanium tetrachloride feed rate was 19.6 grams per minute, and the 1,1,2-trichloroethane rate was 14.4 grams per minute (108 percent excess), 15 SCFH of hydrogen, together with 1.5 SCFH of hydrogen chloride, were introduced together with the titanium tetrachloride reactant as a carrier gas. The process was operated for a period of 3,865 minutes before the run was terminated for inspection. Upon inspection, no titanium carbide product growth was found on the reactant mixer assembly.

The data of Examples III – V show that the addition of hydrogen chloride to the principal reactant mixing zone substantially eliminates titanium carbide product growth on the reactant mixer assembly thereby permitting extended periods of reactor operation.

EXAMPLE VI

Using the apparatus described in Example I, 300 SCFH of hydrogen were introduced into and heated by the medium voltage, medium amperage heater described above. Titanium tetrachloride at a rate of 18.7 grams per minute, along with 20 SCFH hydrogen, were introduced into the hot hydrogen stream through the top slot of the reactant mixer assembly. Boron trichloride, at a rate of 5.13 liters per minute (16.0 percent excess based on $TiCl_4$), along with 22 SCFH of argon, were introduced through the bottom slot of the reactant mixer assembly. The process was continued for about 95 minutes before it was terminated because of a large amount of titanium diboride product growth that was firmly adhered to the middle plate of the reactant assembly.

EXAMPLE VII

The procedure of Example VI was repeated, except that the boron trichloride rate was 5.86 liters per minute (32.5 percent excess) and 12 SCFH of hydrogen chloride was introduced along with the titanium tetrachloride instead of the hydrogen of EXAMPLE VI. After 150 minutes of operation, the process was terminated for inspection of the reactant mixer assembly. No titanium diboride growth was found on the assembly.

EXAMPLE VIII

The procedure of Example VII was repeated, except that the titanium tetrachloride rate was increased to 21.35 grams per minute, which provided for a 15 percent excess of boron trichloride. After operating the equipment for 960 minutes, the run was terminated and the reactant mixer assembly inspected for titanium diboride growth. No growth was found on the assembly.

The date of Examples VI – VIII show the efficacy of using hydrogen halide, e.g., hydrogen chloride in the principal reactant mixing zone.

EXAMPLE IX

Using the apparatus described in Example I, 300 SCFH of hydrogen are introduced into and heated by the medium voltage, medium amperage heater described above. Zirconium tetrachloride at a rate of 23.0 grams per minute, along with 100 SCFH argon, are introduced into the hot hydrogen stream through the top slot of the reactant inlet assembly. Boron trichloride, at a rate of 4.86 liters per minute (10 percent excess based on zirconium tetrachloride, along with 22 SCFH of argon, are introduced through the bottom slot of the reactant inlet assembly. The process is continued for 120 minutes before it is terminated because of zirconium diboride product growth around the inlet ports of the reactant inlet assembly.

EXAMPLE X

The procedure of the Example IX is repeated, except that 25 SCFH of hydrogen chloride and 75 SCFH of argon are introduced along with the zirconium tetrachloride instead of 100 SCFH of argon as in Example IV. After 180 minutes of operation the process is terminated for inspection of the reactant inlet assembly. Substantially no significant zirconium diboride growth is found on the assembly inlet ports.

EXAMPLE XI

Using the apparatus described in Example I, 90 SCFH of nitrogen and 22.5 SCFH of hydrogen are introduced into and heated by the medium voltage, medium amperage heater described above. Titanium tetrachloride at a rate of 12.9 grams per minute along with 20 SCFH of hydrogen are introduced into the hot nitrogen-hydrogen stream through the bottom slot of the reactant inlet assembly. Hydrogen alone, at a rate of 45 SCFH, is introduced through the top slot of the reactant mixer assembly. After 180 minutes operation, the process is terminated and a large amount of titanium nitride product growth is found around the inlet ports of the reactant inlet assembly.

EXAMPLE XII

The procedure of the Example XI is repeated except that 12 SCFH of hydrogen chloride are introduced along with the titanium tetrachloride instead of the 20 SCFH of hydrogen as in Example XI. After 420 minutes of operation, the process is terminated for inspection of the reactant inlet assembly. Substantially no significant titanium nitride growth is found on the assembly inlet ports.

EXAMPLE XIII

Using the apparatus described in Example I, 90 SCFH of nitrogen and 22.5 SCFH of hydrogen are introduced into and heated by the medium voltage, medium amperage heater described above. Zirconium tetrachloride at a rate of 15. 15.9 grams per minute along with 100 SCFH of argon are introduced into the hot nitrogen-hydrogen stream through the bottom slot of the reactant inlet assembly. Hydrogen alone, at a rate of 45 SCFH, is introduced through the top slot of the reactant inlet assembly. AFter 120 minutes operation, the process is terminated and significant amount of zirconium nitride product growth is found around the inlet ports of the reactant inlet assembly.

EXAMPLE XIV

The procedure of the Example XIII is repeated except that 25 SCFH of hydrogen chloride and 75 SCFH of argon are introduced along with the zirconium tetrachloride instead of 100 SCFH of argon as in the Example XIII. After 180 minutes of operation, the process is terminated for inspection of the reactant inlet assembly. No significant zirconium nitride growth is found on the assembly inlet ports.

EXAMPLE XV

Using the apparatus described in Example I, 150 SCFH of argon are introduced into and heated by the medium voltage, medium amperage heater described above. Hydrogen sulfide, at a rate of 4.7 liters per minute (10 percent excess based on $TiCl_4$ reactant and a $TiS_2$ product) is introduced into the hot argon stream through the top slot of the reactant inlet assembly. Titanium tetrachloride at a rate of 18 grams per minute, along with 10 SCFH of argon are introduced into the hot argon stream through the bottom slot of the reactant inlet assembly. After 100 minutes of operation, the process is terminated and a large amount of titanium sulfides ($TiS_2$, $Ti_3S_4$) product growth is found around the inlet ports of the reactant inlet assembly.

EXAMPLE XVI

The procedure of the Example XV is repeated except that 11 SCFH of hydrogen chloride is introduced along with the titanium tetrachloride reactant instead of 10 SCFH of argon as in Example XV. After 150 minutes of operation, the process is terminated for inspection of the reactant inlet assembly. No significant titanium sulfide growth is found on the assembly inlet ports.

EXAMPLE XVII

Using the apparatus described in Example I, 300 SCFH of hydrogen are introduced into and heated by the medium voltage, medium amperage heater described above. Titanium tetrachloride, at a rate of 13.2 grams per minute (10% excess based on $SiCl_4$ reactant and a $TiSi_2$ Product), along with 45 SCFH of hydrogen are introduced into the hot hydrogen stream through the top slot of the reactant inlet assembly. Silicon tetrachloride, at a rate of 21.5 grams per minute, along with 20 SCFH of hydrogen are introduced through the bottom slot of the reactant inlet assembly. The process is continued for 120 minutes before it is terminated because of a significant amount of titanium silicides (($TiSi_2$, $Ti_5Si_3$) product growth around the inlet ports of the reactant inlet assembly.

EXAMPLE XVIII

The procedure of the Example XVII is repeated, except that 12 SCFH of hydrogen chloride and 33 SCFH of hydrogen are introduced along with the titanium tetrachloride instead of 45 SCFH of hydrogen as in Example XVII. After 240 minutes of operation, the process is terminated for inspection of the reactant inlet assembly. No significant titanium silicide growth is found on the assembly inlet ports.

The data of Examples IX – XVIII show the utility of using hydrogen halide in the principal reactant mixing zone for the production of metal nitrides, borides, sulfides and silicides.

The refractory compositions of the present invention are known materials having established utilities. The carbides, borides, nitrides and silicides of the metals described herein represent the basic constituents of the metal-bonded ("cemented") procucts now widely used as tool and wear- and heat resistant materials. The refractory sulfides are suitable for use as container materials, e.g., for vacuum melting of materials which require complete absence of oxygen. Sulfides, e.g., molybdenum and titanium disulfides are also useful as solid lubricants.

Although the present process has been described with reference to specific details of certain embodiments thereof, it is not intended that such details should be regarded as limitations upon the scope of the invention except as and to the extent that they are included in the accompanying claims.

We claim:

1. In the process of producing finely-divided refractory powder selected from the group consisting of borides, carbides, silicides, nitrides and sulfides of a metal selected from groups III-V of the Periodic Chart of the Elements by vapor phase reaction in a reactor of a halide of the selected metal and a source of boron, carbon, silicon, nitrogen or sulfur respectively as reactants, wherein the reactants are introduced into a principal reactant mixing zone of the reactor through reactant inlet assembly means and reacted to produce a finely-divided powdery product and wherein powdery product tends to accumulate and grow on exposed surfaces of the reactant inlet assembly means that are exposed to said reactants, the improvement which comprises projecting a stream of hydrogen gas into the principal reactant mixing zone, introducing said reactants and substantially anhydrous hydrogen halide into the principal reactant mixing zone, said hydrogen halide being introduced in amounts sufficient to retard growth of powdery product on said exposed surfaces, the halide portion of said hydrogen halide corresponding to the halide of the selected metal, reacting said reactants out of contact with exposed surfaces of the reactor, and removing the powdery product from the reactor.

2. The process of claim 1 wherein the amount of hydrogen halide used is from about 1 to about 100 weight percent based on the selected metal halide.

3. The process of claim 2 wherein the metal halide is the metal chloride and the hydrogen halide is hydrogen chloride.

4. The process of claim 3 wherein the selected metal is silicon, titanium, zirconium, hafnium, tantalum, or vanadium.

5. The process of claim 1 wherein the refractory powder is selected from the borides, carbides and nitrides of the metals of groups IV and V of the Periodic Chart of the Elements.

6. The process of claim 5 wherein the refractory powder is selected from the borides, carbides and nitrides of a metal selected from the group consisting of silicon, titanium and zirconium, the amount of hydrogen halide used is from about 2 to about 80 weight percent based on the selected metal halide, the metal halide is the metal chloride and the hydrogen halide is hydrogen chloride.

7. The process of claim 1 wherein the stream of hydrogen gas is a hydrogen plasma.

8. In the process of producing finely-divided refractory powder selected from the group consisting of borides, carbides and nitrides of a metal selected from groups III-V of the Periodic Chart of the Elements by vapor phase reaction in a reactor of a halide of the selected metal and a source of boron, carbon or nitrogen respectively as reactants, wherein the reactants are introduced into a principal reactant mixing zone of the reactor through a reactant inlet assembly means and reacted to produce a finely-divided powdery product and wherein powdery product tends to accumulate and grow on exposed surfaces of the reactant inlet assembly means that are exposed to said reactants, the improvement which comprises projecting a hydrogen plasma stream into the principal reactant mixing zone, introducing said reactants and from about 2 to about 80 weight percent, based on the selected metal halide, of substantially anhydrous hydrogen halide into the principal reactant mixing zone, said amount of hydrogen halide being sufficient to retard growth of powdery product on said exposed surfaces, the halide portion of said hydrogen halide corresponding to the halide of the selected metal, reacting said reactants out of contact with exposed surfaces of the reactor, and removing the powdery product from the reactor.

9. The process of claim 8 wherein the refractory powder is selected from the borides, carbides and nitrides of the metals of groups IV and V of the Periodic Chart of the Elements.

10. The process of claim 8 wherein the hydrogen halide is used in amounts of from 5 to 50 weight percent, based on the metal halide.

11. The process of claim 8 wherein the metal halide is the metal chloride.

12. The process of claim 8 wherein the refractory powder is selected from the borides, carbides and nitrides of silicon, titanium or zirconium, the metal halide is the metal chloride, and the hydrogen halide is hydrogen chloride.

13. The process of claim 12 wherein the boride is titanium diboride and the carbide is titanium carbide or silicon carbide.

14. The process of claim 13 wherein the reactants are introduced into the reactor at temperatures below the temperatures at which the reaction is conducted and the reactants are heated to such reaction temperatures with the hydrogen plasma stream.

15. The process of claim 14 wherein the refractory powder is titanium diboride, the reactants are titanium tetrachloride and boron trichloride, and the hydrogen halide is hydrogen chloride.

16. The process of claim 14 wherein the refractory carbide is titanium carbide or silicon carbide, the metal halide is titanium tetrachloride or silicon tetrachloride respectively, the source of carbon is hydrocarbons, halogenated hydrogens or mixtures of such compounds containing from 1 to 12 carbon atoms, and the hydrogen halide is hydrogen chloride.

* * * * *